United States Patent [19]
Eum et al.

[11] Patent Number: 6,154,244
[45] Date of Patent: Nov. 28, 2000

[54] BEAM SCANNING APPARATUS OF ELECTROPHOTOGRAPHIC COLOR PRINTER

[75] Inventors: Jae-yong Eum; Yong-keun Kim, both of Suwon, Rep. of Korea

[73] Assignee: Samsung Electronics Co., Ltd., Kyungki-Do, Rep. of Korea

[21] Appl. No.: 09/098,979

[22] Filed: Jun. 17, 1998

[30]     Foreign Application Priority Data

Feb. 16, 1998 [KR] Rep. of Korea .......................... 98-4612

[51] Int. Cl.⁷ ...................................................... B41J 15/14
[52] U.S. Cl. ............................ 347/243; 347/260; 347/261
[58] Field of Search ..................................... 347/243, 259, 347/260, 261; 359/17, 18, 201, 209, 204, 203

[56]              References Cited

U.S. PATENT DOCUMENTS 5,598,203  1/1997  Choi ........................................ 347/259
5,691,761  11/1997 Fisli ........................................ 347/243
5,861,977  1/1999  Harrigan et al. ........................ 359/203
5,870,132  2/1999  Inoue et al. ............................. 347/243

*Primary Examiner*—N. Le
*Assistant Examiner*—Lamson D. Nguyen
*Attorney, Agent, or Firm*—Sughrue, Mion, Zinn, Macpeak & Seas, PLLC

[57]              ABSTRACT

A beam scanning apparatus of an electrophotographic color printer having first and second light sources, and a deflecting unit including a driving source and first and second beam deflectors. The driving source has a rotation shaft and the first and second beam deflectors are coaxially installed on the rotation shaft and respectively deflect and scan beams of light emitted from the first and second light sources. First and second beam correcting units are arranged along the path of light between the deflecting unit and a photoreceptor and respectively correct the beams deflected by the first and second beam deflectors.

5 Claims, 4 Drawing Sheets

BEAM SCANNING APPARATUS OF ELECTROPHOTOGRAPHIC COLOR PRINTER

BACKGROUND OF THE INVENTION

1. Field of the Invention

The present invention relates to a beam scanning apparatus of an electrophotographic color printer.

2. Description of the Related Art

FIG. 1 shows a general electrophotographic color printer. Referring to the drawing, an electrophotographic color printer includes a photoreceptor, such as a photoreceptor belt 1, and a beam scanning apparatus 30 for exposing the photoreceptor belt 1 to light to form an electrostatic latent image. Developing units 21, 22, 23, and 24 develop the electrostatic latent image.

During operation, the photoreceptor belt 1 circulates around guide rollers 3. An image record surface of the photoreceptor belt 1 is exposed by a beam emitted from the beam scanning apparatus 30. The beam scanning apparatus 30 is positioned at the upstream side of each of the developing units 21–24 which develop the electrostatic latent.

The respective developing units 21–24 develop images of different colors, e.g., yellow, magenta, cyan, and black. The developed image is dried by a drying unit 8 and then transferred via a transfer roller 9 to a paper 10 passing between the transfer roller 9 and a fusing roller 11. The electrostatic latent image remaining on the photoreceptor belt 1 is removed by a reset unit 2.

FIG. 2 shows a conventional beam scanning apparatus which is adopted in the above electrophotographic color printer to expose the photoreceptor to light. Referring to the drawing, the conventional beam scanning apparatus 30 includes a light source 31, a beam deflector 34 for deflecting light emitted from the light source 31, and an f-θ lens 37 for correcting an error of the light deflected by the beam deflector 34.

Also, a focusing lens 33 for focusing the divergent beam emitted from the light source 31 is provided between the light source 31 and the beam deflector 34. A mirror 38 for changing a path of the beam is provided between the beam deflector 34 and the photoreceptor (not shown). The focusing lens 33 determines the size of an optical spot formed on the photoreceptor.

The beam deflector 34 includes a motor 35 and a rotary polygonal mirror 36 which is rotated by the motor 35. The beam input to the beam deflector 34 is deflected according to an angle made between a reflection surface of the rotary polygonal mirror 36 and the input beam.

In the beam scanning apparatus 30 having the above structure, the photoreceptor is exposed to light by a main scanning direction by the beam deflector 34 and a sub-scanning direction by the movement of the photoreceptor 1 which is perpendicular to the main-scanning direction.

However, the above structure of the beam scanning apparatus 30 having the rotary polygonal mirror 36 and the motor 35 is complicated. Further, in a color printer, the beam scanning apparatus 30 is required for each color formed into a color image, thereby increasing the size of the apparatus.

SUMMARY OF THE INVENTION

To solve the above problems, it is an object of the present invention to provide a beam scanning apparatus of an electrophotographic color printer having a compact structure by reducing the number of driving sources for driving the beam deflectors.

Accordingly, to achieve the above objective, a beam scanning apparatus of an electrophotographic color printer is provided, with first and second light sources, a deflecting unit including a driving source having a rotation shaft, and first and second beam deflectors coaxially installed on the rotation shaft for respectively deflecting and scanning beams of light emitted from the first and second light sources. First and second beam correcting means, arranged along the path of light between the deflecting unit and a photoreceptor, correct the beams deflected by the first and second beam deflectors, respectively.

It is preferable that the first beam deflector is a rotary polygonal mirror having a plurality of reflection surfaces for reflecting an input beam, and the second beam deflector is a deflection disk comprised of a plurality of sectors for diffracting and deflecting the input beam.

Also, it is preferable that the sectors are formed equally on the deflection disk and that each sector is patterned so that the input beam is diffracted according to rotation of the deflection disk and scanned by one scanning line unit. Also, the number of reflection surfaces of the rotary polygonal mirror equals that of the number of sectors of the deflection disk.

In the preferred embodiment of the present invention, the first beam correcting means is an f-θ lens for correcting the focus position and the scanning width of the input beam. The second beam correcting means includes a reflection member for focusing and reflecting the input beam, and a hologram element for diffracting and transmitting the beam reflected by the reflection member in a direction roughly perpendicular to the sub-scanning direction of the photoreceptor.

According to another aspect of the present invention, a beam scanning apparatus of an electrophotographic color printer includes first through fourth light sources, a first deflecting unit including a driving source having a rotation shaft, and first and second beam deflectors coaxially installed on the rotation shaft for respectively deflecting and scanning beams of light emitted from the first and second light sources. A second deflecting unit includes a driving source having a rotation shaft, and third and fourth beam deflectors coaxially installed on the rotation shaft, for respectively deflecting and scanning beams of light emitted from the third and fourth light sources. The beam scanning apparatus also includes first and second beam correcting means, arranged along the path of light between the first deflecting unit and a photoreceptor, for respectively correcting the beams deflected by the first and second beam deflectors, and third and fourth beam correcting means, arranged along the path of light between the second deflecting unit and a photoreceptor, for respectively correcting the beams deflected by the third and fourth beam deflectors.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 3:
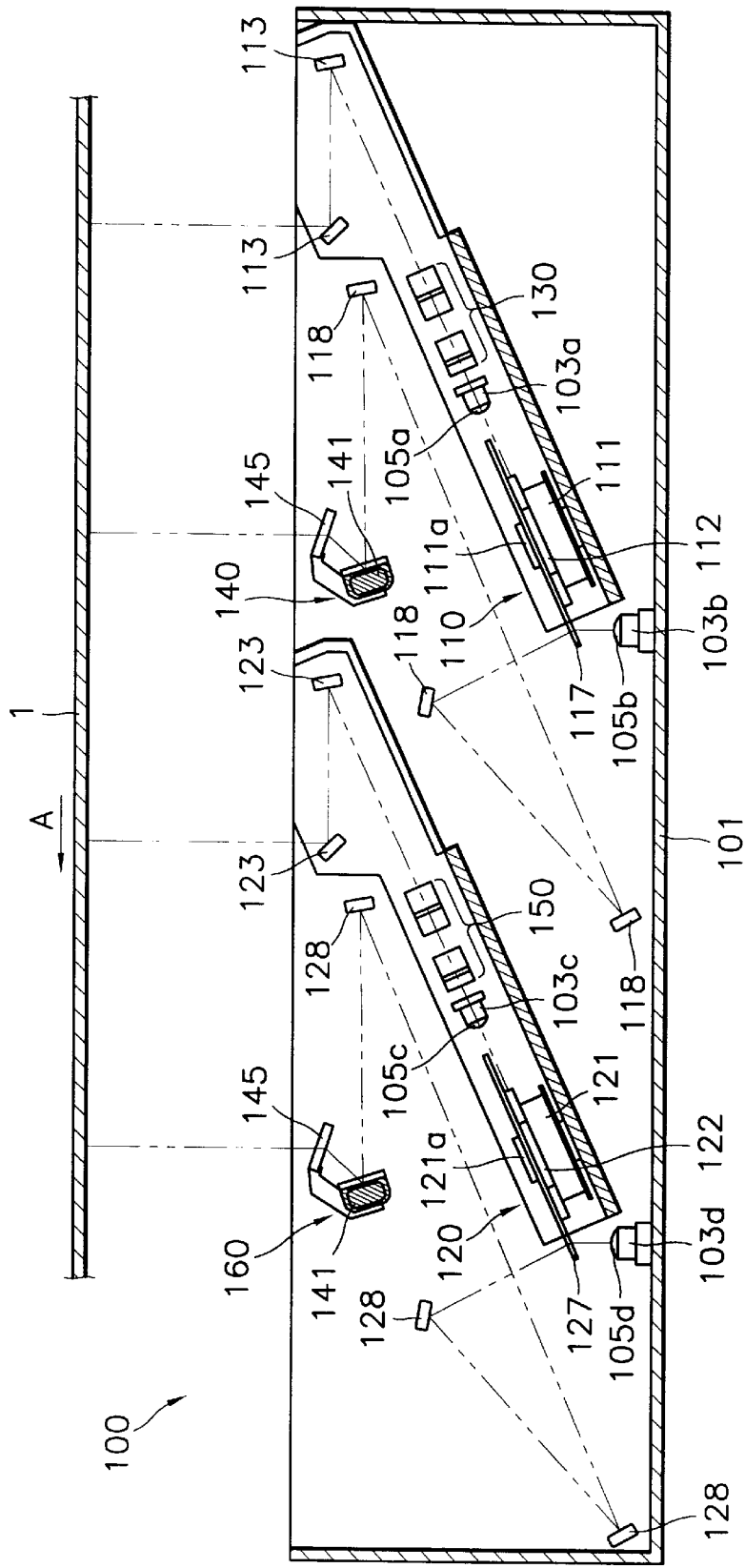
FIG. 3 is a view illustrating a beam scanning apparatus of an electrophotographic color printer according to a preferred embodiment of the present invention.

As shown in FIG. 3, a beam scanning apparatus 100 according to a preferred embodiment of the present invention includes a plurality of light sources 103a, 103b, 103c, and 103d, a first beam deflecting unit 110 for deflecting and scanning the beams input from the first and second light sources 103a and 103b, a second beam deflecting unit 120 for deflecting and scanning the beams input from the third and fourth light sources 103c and 103d, and beam correcting means 130, 140, 150, and 160 for correcting the input beam. Reference numerals the same as in FIG. 1 indicate the same elements.

The beam scanning apparatus 100 installed on a frame 101 selectively scans a beam of light onto the photoreceptor 1 according to each color. Preferably, the light sources 103a, 103b, 103c, and 103d are semiconductor lasers for generating and emitting a laser beam to form color images on the photoreceptor 1. The beams emitted from the light sources 103a, 103b, 103c, and 103d are converted into parallel beams by collimating lenses 105a, 105b, 105c, and 105d, respectively.

The first beam deflecting unit 110 includes a first driving motor 111 for supplying a rotational force and first and second beam deflectors 112 and 117, installed on a rotating shaft 111a of the first driving motor 111, for respectively deflecting and scanning beams input from the first and second light sources 103a and 103b. The second beam deflecting unit 120 includes a second driving motor 121 for supplying a rotational force and third and fourth beam deflectors 122 and 127, installed on a rotating shaft 121a of the second driving motor 121, for respectively deflecting and scanning beams input from the third and fourth light sources 103c and 103d.

In the present embodiment, the first and third beam deflectors 112 and 122 are preferably rotary polygonal mirrors, each having a plurality of reflection surfaces. Also, the second and fourth beam deflectors 117 and 127 are deflection disks, each consisting of a plurality of sectors for diffracting and deflecting the input beams.

Figure 4:
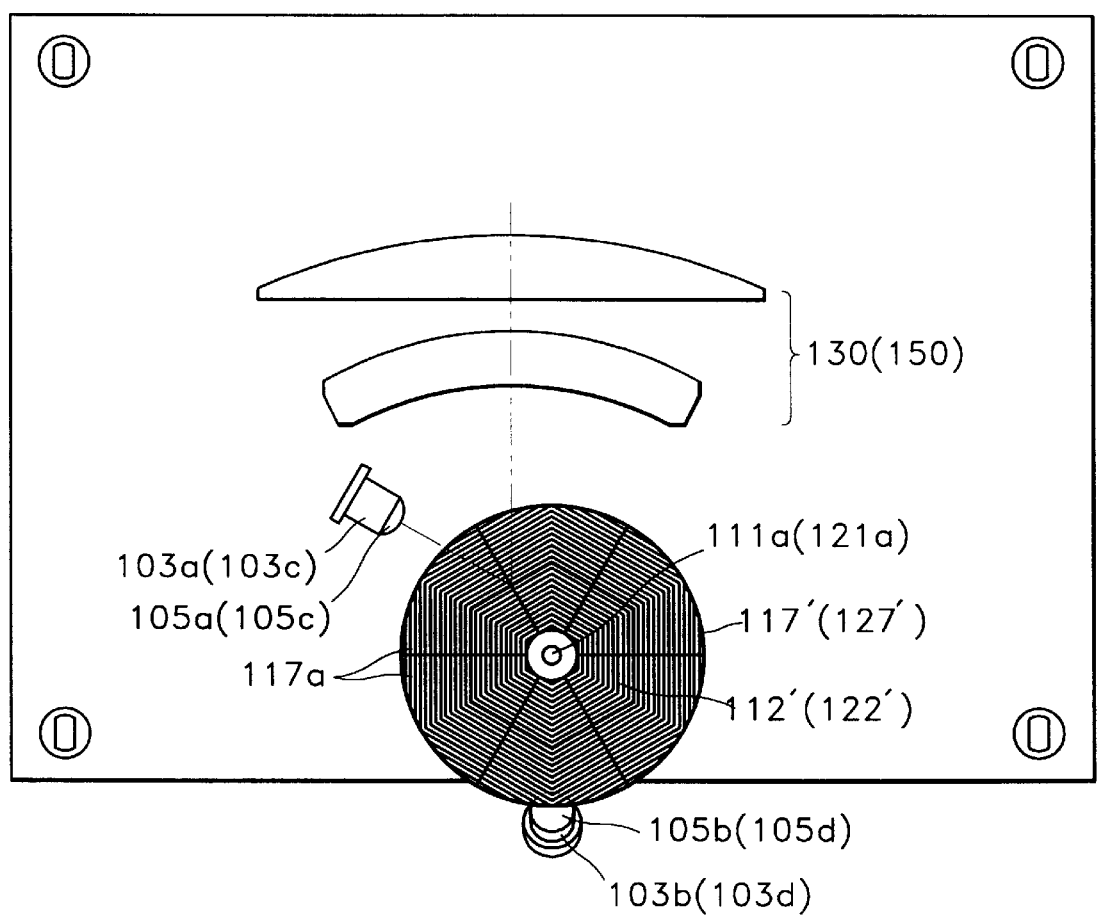
FIG. 4 is a plan view illustrating a portion of the apparatus in FIG. 3.

Such a rotary polygonal mirror and a deflection disk are shown in FIG. 4. As shown in the drawing, rotary polygonal mirrors 112' and 122' respectively installed on rotary shafts 111a and 121a of the first and second driving motors 111 and 121 deflect and scan the beams according to an angle formed between the input beam and the reflection surface of the rotary polygonal mirror 112' and 122', as the first and second driving motors 111 and 121 rotate.

Deflection disks 117' and 127' are coaxially installed on the shaft of the rotary polygonal mirrors 112' and 122'. The deflection disks 117' and 127' each consist of at least two equally divided sectors 117a. Each sector 117a is patterned to diffract the input beam and deflect and scan the diffracted beam by one scanning line as the deflection disks 117' and 127' rotate. In order to enable a concurrent scanning of beams by the deflection disks 117' and 127' and the rotary polygonal mirrors 112' and 122' by a unit of one scanning line, the number of reflection surfaces of the rotary polygonal mirror is preferably the same as that of the corresponding sectors of the deflection disk.

According to the present invention, although not shown, two deflection disks or two rotary polygonal mirrors can be installed on a rotation shaft of one driving motor.

Referring to FIG. 3 again, the beam correcting means 130, 140, 150, and 160 correct aberration of the beam deflected and scanned in a main scanning direction by the beam deflectors 112, 117, 122, and 127, and shape the beam. In other words, the first and third beam correcting means 130 and 150 are arranged along the path of the beams respectively emitted from the first and third light sources 103a and 103c to correct the position of a focus and the scanning width of the beam deflected by the first and third deflectors 112 and 122. Preferably, an f-θ lens is provided for the first and third beam correcting means 130 and 150.

A plurality of mirrors 113 and 123 are arranged along the path of light between the first and third beam deflectors 112 and 122 and the photoreceptor 1 to change the proceeding path of the deflected beam.

Also, each of the second and fourth correcting means 140 and 160 includes a reflection member 141 for focusing and reflecting the beam emitted from the second and fourth light sources 103b and 103d and deflected by the second and fourth deflectors 117 and 127, and a hologram element 145 for diffracting and transmitting the beam reflected by the reflection member 141.

Preferably, the reflection member 141 is a curved mirror for focusing the input beam. The hologram element 145 diffracts and transmits the beam reflected by the reflection member 141 in a sub-scanning direction of the photoreceptor 1, e.g., in a direction approximately perpendicular to a proceeding direction "A" of the photoreceptor 1.

A plurality of mirrors 118 and 128 are arranged along the path of light between the second and fourth beam deflectors 117 and 127 and the photoreceptor 1 to change the proceeding path of the deflected beam.

Although an f-θ lens is adopted as the first and third beam correcting means and a reflection member and a hologram element are adopted as the second and fourth correcting means in the present embodiment, the first and third correcting means can be a reflection member and a hologram element and the second and fourth correcting means can be an f-θ lens. Further, all beam correcting means can be either the reflection member and the hologram element, or the f-θ lens.

Figure 1:
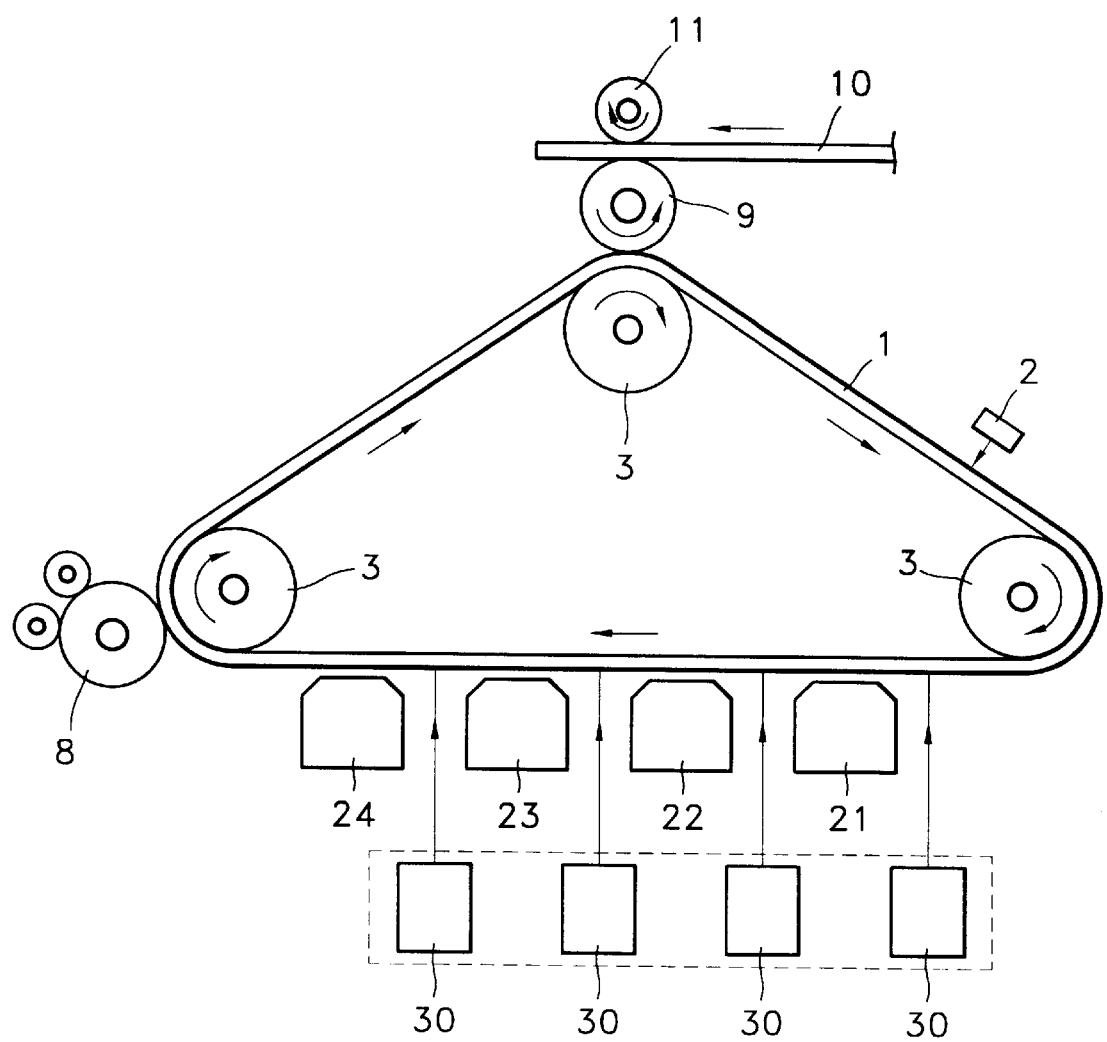
FIG. 1 is a view schematically showing the general electrophotographic color printer.
Figure 2:
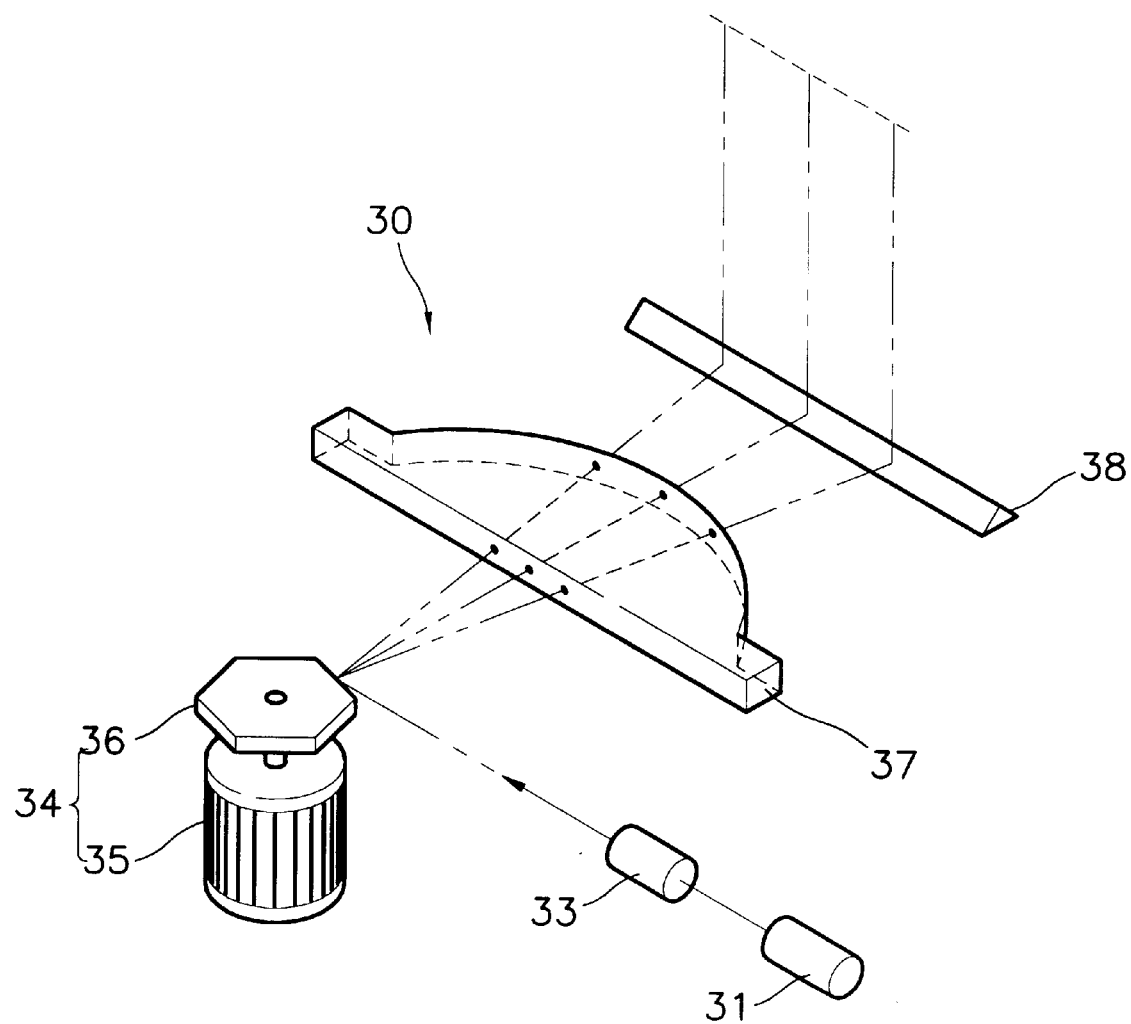
FIG. 2 is a perspective view illustrating the beam scanning apparatus of an electrophotographic color printer according to the conventional technology.

In the present embodiment, the light emitted from the first through fourth light sources 103a, 103b, 103c, and 103d is used to form color images, as described with reference to FIG. 1; however, only one beam scanning apparatus is required.

Thus, in the beam scanning apparatus of an electrophotographic printer of the present invention, since two beam deflectors are installed on the rotation shaft of one driving motor and at least one of the two beam reflectors is a deflection disk, the number of parts can be reduced and the structure is simplified so that miniaturization of the apparatus is possible.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A beam scanning apparatus of an electrophotographic color printer comprising:

first and second light sources;

a deflecting unit including a driving source having a rotation shaft, and first and second beam deflectors coaxially installed on said rotation shaft for respectively deflecting and scanning beams of light emitted from said first and second light sources; and first and second beam correcting means, arranged along the path of light between said deflecting unit and a photoreceptor, for respectively correcting the beams deflected by said first and second beam deflectors, wherein said first beam deflector is a rotary polygonal mirror having a plurality of reflection surfaces for reflecting an input beam, and said second beam deflector is a deflection disk comprised of a plurality of sectors for diffracting and deflecting the input beam.

2. The beam scanning apparatus as claimed in claim 1, wherein said sectors are formed equally on said deflection disk and each sector is patterned so that the input beam is diffracted and deflected according to rotation of said deflection disk so as to be scanned into a scanning line.

3. The beam scanning apparatus as claimed in claim 1, wherein the number of reflection surfaces of said rotary polygonal mirror equals the number of sectors of said deflection disk.

4. The beam scanning apparatus as claimed in claim 1, wherein said first beam correcting means is an f-θ lens for correcting the position of the focus and the scanning width of the input beam, and said second beam correcting means comprises:

a reflection member for focusing and reflecting the input beam; and a hologram element for diffracting and transmitting the beam reflected by said reflection member in a direction approximately perpendicular to a sub-scanning direction of said photoreceptor.

5. A beam scanning apparatus of an electrophotographic color printer comprising:

first through fourth light sources;

a first deflecting unit including a driving source having a rotation shaft, and first and second beam deflectors coaxially installed on said rotation shaft for respectively deflecting and scanning beams of light emitted from said first and second light sources;

a second deflecting unit including a driving source having a rotation shaft, and third and fourth beam deflectors, coaxially installed on said rotation shaft, for respectively deflecting and scanning beams of light emitted from said third and fourth light sources;

first and second beam correcting means, arranged along the path of light between said first deflecting unit and a photoreceptor, for respectively correcting the beams deflected by said first and second beam deflectors; and third and fourth beam correcting means, arranged along the path of light between said second deflecting unit and a photoreceptor, for respectively correcting the beams deflected by said third and fourth beam deflectors, wherein said first and third beam deflectors are rotary polygonal mirrors having a plurality of reflection surfaces for reflecting input beams, and said second and fourth beam deflectors are deflection disks comprised of a plurality of sectors for diffracting and deflecting the input beams.

* * * * *